United States Patent
Li (10) Patent No.: US 11,163,591 B2
(45) Date of Patent: Nov. 2, 2021

(54) POWER MANAGEMENT METHOD AND DEVICE, ELECTRONIC APPARATUS, AND COMPUTER PROGRAM PRODUCT

(71) Applicant: CLOUDMINDS (SHENZHEN) ROBOTICS SYSTEMS CO., LTD., Shenzhen (CN)

(72) Inventor: Yangang Li, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 256 days.

(21) Appl. No.: 16/427,314

(22) Filed: May 30, 2019

(65) Prior Publication Data
US 2019/0286205 A1 Sep. 19, 2019

Related U.S. Application Data

(63) Continuation of application No. PCT/CN2016/112492, filed on Dec. 27, 2016.

(51) Int. Cl.
*G06F 1/26* (2006.01)
*G06F 1/3206* (2019.01)
(Continued)

(52) U.S. Cl.
CPC ............ *G06F 9/455* (2013.01); *G06F 1/3206* (2013.01); *G06F 9/4401* (2013.01); *G06F 9/445* (2013.01); *G06F 1/266* (2013.01); *G06F 1/3253* (2013.01)

(58) Field of Classification Search
None
See application file for complete search history.

(56) References Cited

U.S. PATENT DOCUMENTS

| 8,037,473 B2 | 10/2011 | Medvedev |
| 8,533,381 B2 * | 9/2013 | Uehara ............... G06F 13/4022 710/316 |

(Continued)

FOREIGN PATENT DOCUMENTS

| CN | 101154130 A | 4/2008 |
| CN | 101739283 A | 6/2010 |

(Continued)

OTHER PUBLICATIONS

International Search Report in the international application No. PCT/CN2016/112492, dated Sep. 28, 2017.
(Continued)

*Primary Examiner* — Umut Onat
(74) *Attorney, Agent, or Firm* — IPro, PLLC (57) ABSTRACT

A power management method and device for a multi-operating system (OS) electronic apparatus can employ a host OS including first power attribute files, each including a power pack name and a power attribute name. A guest OS includes second power attribute files, each including a pack name code and an attribute name code corresponding respectively to a power pack name and a power attribute name in each first power attribute file. When any second power attribute file is called, a pack name code and an attribute name code corresponding thereto are decoded in the guest OS to obtain a called power pack name and a called power attribute name, which are then sent to the host OS. The host OS then provides the corresponding first power attribute file to the guest OS. The invalidity risk of any power attribute file in the multi-OS electronic apparatus can therefore be reduced.

20 Claims, 7 Drawing Sheets

(51) Int. Cl.
*G06F 1/3234* (2019.01)
*G06F 9/455* (2018.01)
*G06F 9/4401* (2018.01)
*G06F 9/445* (2018.01)

(56) References Cited

U.S. PATENT DOCUMENTS

| | | | | |
|---|---|---|---|---|
| 8,615,579 | B1* | 12/2013 | Vincent | G06F 9/4893 709/224 |
| 8,650,358 | B2* | 2/2014 | Iwamitsu | G06F 1/3221 711/114 |
| 9,921,862 | B2* | 3/2018 | Dong | G06F 9/45533 |
| 10,108,251 | B2* | 10/2018 | Banerjee | G06F 1/3212 |
| 2011/0185356 | A1 | 7/2011 | Shetty | |
| 2012/0102492 | A1* | 4/2012 | Iwata | G06F 9/45533 718/1 |
| 2013/0332751 | A1* | 12/2013 | Iwata | G06F 1/26 713/300 |
| 2015/0212841 | A1 | 7/2015 | Tsirkin et al. | |

FOREIGN PATENT DOCUMENTS

| | | |
|---|---|---|
| CN | 102023887 A | 4/2011 |
| CN | 102117113 A | 7/2011 |
| CN | 102520780 A | 6/2012 |
| CN | 106200858 A | 12/2016 |

OTHER PUBLICATIONS

English translation of the Written Opinion of the International Search Authority in the international application No. PCT/CN2016/112492, dated Sep. 28, 2017.
Research on Computing Productivity Optimization in Virtualization Environment, CHEN, Huacai, published on May 15, 2012.
Marija D. Ilic. Dynamic Monitoring and Decision Systems for Enabling Sustainable Energy Services adapted from Proceedings of the IEEE, published on Dec. 3, 2010.

* cited by examiner

POWER MANAGEMENT METHOD AND DEVICE, ELECTRONIC APPARATUS, AND COMPUTER PROGRAM PRODUCT

CROSS-REFERENCE TO RELATED APPLICATION

The present application is a continuation of International Patent Application No. PCT/CN2016/112492 filed on Dec. 27, 2016, the disclosure of which is incorporated by reference herein in its entirety.

BACKGROUND

Multiple virtual machines may be deployed in an embedded system, and each virtual machine may provide an environment for running a guest operating system (OS) and its related application programs. All guest operating systems typically share with a host operating system a battery provided by a hardware device.

At present, a typical power management method is as follows. Multiple power packs, such as a direct current power pack, a Universal Serial Bus (USB) pack, and a battery pack, etc., are organized according to their different attributes. Each power pack includes multiple power attributes including, for example, a current, a voltage, and whether the present power pack is in an active state or not, etc. An attribute pair <power pack, power attribute> can be assigned to each power pack along with one of the multiple power attributes thereof.

When a power module driver of each operating system is initialized, a power attribute file corresponding to each attribute pair in a one-to-one relationship is typically created, and the power attribute file typically includes a power pack name, a power attribute name and a power attribute value. An application program in the operating system may access the power attribute file to obtain a value of the corresponding power attribute. When a power attribute changes, each power module driver reports an event to an application space in each operating system, and a program in the application space may receive the event to thereby obtain a change of the power attribute.

SUMMARY

The present disclosure relates to the technical field of virtualization, and particularly to a power management method, a power management device implementing the power management method, an electronic apparatus having the power management device, and a computer program product.

Various embodiments provide a power management method and device, an electronic apparatus and a computer program product.

In a first aspect, a method for managing power supply in an electronic apparatus (e.g. a computing system) having a host operating system and a guest operating system (i.e. power management method) is provided, which includes the following operations or steps:

providing a plurality of first power attribute files in the host operating system and a plurality of second power attribute files in the guest operating system. Herein each of the plurality of first power attribute files comprises a power pack name and a power attribute name; and each of the plurality of second power attribute files corresponds to a pack name code and an attribute name code that correspond respectively to a power pack name and a power attribute name in each of the plurality of first power attribute files;

decoding, when the guest operating system calls any of the plurality of second power attribute files, a pack name code and an attribute name code corresponding to the any of the plurality of second power attribute files to thereby obtain a called power pack name and a called power attribute name, and sending the called power pack name and the called power attribute name to the host operating system; and providing, in the host operating system upon receiving the called power pack name and the called power attribute name, a first power attribute file corresponding to the called power pack name and the called power attribute name to the guest operating system.

According to some embodiments of the method, the step or operation of providing a plurality of first power attribute files in the host operating system and a plurality of second power attribute files in the guest operating system can include the following sub-steps:

generating, in the host operating system, the plurality of first power attribute files;

generating in the host operating system, and sending to the guest operating system, a pack name code and an attribute name code that correspond respectively to a power pack name and a power attribute name in each of the plurality of first power attribute files; and generating, in the guest operating system, a second power attribute file corresponding to the pack name code and the attribute name code that correspond respectively to the power pack name and the power attribute name in the each of the plurality of first power attribute files to thereby generate the plurality of second power attribute files.

Optionally, the above sub-step of generating, in the host operating system, the plurality of first power attribute files is performed when the host operating system is started.

Optionally, the above sub-step of generating in the host operating system, and sending to the guest operating system, a pack name code and an attribute name code that correspond respectively to a power pack name and a power attribute name in each of the plurality of first power attribute files comprises an operation of: acquiring, in the host operating system, the power pack name and the power attribute name in the each of the plurality of first power attribute files. Herein optionally, the above operation of the acquiring, in the host operating system, the power pack name and the power attribute name in the each of the plurality of first power attribute files can be performed by means of a power management module back end.

The above sub-step of generating, in the guest operating system, a second power attribute file corresponding to the pack name code and the attribute name code that correspond respectively to the power pack name and the power attribute name in the each of the plurality of first power attribute files to thereby generate the plurality of second power attribute files is optionally performed when the guest operating system is started, and is further optionally performed by means of a power management module driver.

According to some embodiments of the present disclosure, after the step of providing a plurality of first power attribute files in the host operating system and a plurality of second power attribute files in the guest operating system, the method further includes the following steps:

generating, upon detecting a change in any of the plurality of first power attribute files in the host operating system, a pack name code and an attribute name code that correspond respectively to a power pack name and a power attribute name in the any of the plurality of first power attribute files, and sending the pack name code and the attribute name code to the guest operating system; and reporting, in the guest operating system, the pack name code and the attribute name code to a user space of the guest operating system.

Herein optionally, the step of generating, upon detecting a change in any of the plurality of first power attribute files in the host operating system, a pack name code and an attribute name code that correspond respectively to a power pack name and a power attribute name in the any of the plurality of first power attribute files, and sending the pack name code and the attribute name code to the guest operating system is performed by means of a power management module back end.

Herein optionally, the step of reporting, in the guest operating system, the pack name code and the attribute name code to a user space of the guest operating system to thereby notify that the any of the plurality of first power attribute files changes is by means of a power management module driver.

According to some embodiments of the present disclosure, after the step of providing a plurality of first power attribute files in the host operating system and a plurality of second power attribute files in the guest operating system, the method further includes the following steps:

sending, upon detecting a change in any of the plurality of first power attribute files in the host operating system, a power attribute file change prompt to the guest operating system;

sending in the guest operating system, upon receiving the power attribute file change prompt in the guest operating system, a restarting message to a user; and restarting, upon the user responding to the restarting message, the guest operating system to thereby synchronize the plurality of second power attribute files in the guest operating system with the plurality of first power attribute files in the host operating system.

In a second aspect, the present disclosure further provides a device for managing power supply in an electronic apparatus (e.g. a computing system) comprising a host operating system and a guest operating system. The device includes a first sending module, a generation module, a second sending module, and a providing module.

The first sending module is configured to generate in the host operating system, and then to send to the guest operating system, a pack name code and an attribute name code that correspond respectively to a power pack name and a power attribute name in each of a plurality of first power attribute files in the host operating system.

The generation module is configured to generate in the guest operating system a second power attribute file corresponding to the pack name code and the attribute name code that correspond respectively to the power pack name and the power attribute name in the each of the plurality of first power attribute files to thereby generate the plurality of second power attribute files.

The second sending module is configured, when the guest operating system calls any of the plurality of second power attribute files, to decode a pack name code and an attribute name code corresponding to the any of the plurality of second power attribute files to thereby obtain a called power pack name and a called power attribute name, and then to send the called power pack name and the called power attribute name to the host operating system.

The providing module is configured, upon the host operating system receiving the called power pack name and the called power attribute name, to a first power attribute file corresponding to the called power pack name and the called power attribute name to the guest operating system.

According to some embodiments of the present disclosure, the device further includes a third sending module and a reporting module. The third sending module is configured, upon detecting a change in any of the plurality of first power attribute files in the host operating system, to generate in the host operating system, and then to send to the guest operating system, a pack name code and an attribute name code that correspond respectively to a power pack name and a power attribute name in the any of the plurality of first power attribute files, and the reporting module is configured to report in the guest operating system the pack name code and the attribute name code to a user space of the guest operating system.

Optionally in the device, the generation module is configured to generate in the guest operating system a second power attribute file corresponding to the pack name code and the attribute name code that correspond respectively to the power pack name and the power attribute name in the each of the plurality of first power attribute files when the guest operating system is started.

Optionally in the device, the generation module is configured to generate in the guest operating system a second power attribute file corresponding to the pack name code and the attribute name code that correspond respectively to the power pack name and the power attribute name in the each of the plurality of first power attribute files by means of a power management module driver.

According to some embodiments of the present disclosure, the device further includes a fourth sending module and a processing module. The fourth sending module is configured to send, upon detecting a change in any of the plurality of first power attribute files in the host operating system, a power attribute file change prompt to the guest operating system, and the processing module is configured to send in the guest operating system, upon receiving the power attribute file change prompt in the guest operating system, a restarting message to a user.

In a third aspect, the present disclosure further comprises an electronic apparatus. The electronic apparatus comprises one or more processors and a memory which is communicatively connected with the one or more processors, for example, through a communication bus.

The one or more processors are configured to execute instructions in the memory, and the instructions are configured to execute each step of the method for managing power supply in the electronic apparatus comprising a host operating system and a guest operating system. Herein the method can be based on any one of the embodiments as described above. Specifically, the method can include the following steps/operations:

providing a plurality of first power attribute files in the host operating system and a plurality of second power attribute files in the guest operating system, wherein each of the plurality of first power attribute files comprises a power pack name and a power attribute name, and each of the plurality of second power attribute files corresponds to a pack name code and an attribute name code that correspond respectively to a power pack name and a power attribute name in each of the plurality of first power attribute files;

decoding, when the guest operating system calls any of the plurality of second power attribute files, a pack name code and an attribute name code corresponding to the any of the plurality of second power attribute files to thereby obtain a called power pack name and a called power attribute name, and sending the called power pack name and the called power attribute name to the host operating system; and providing, in the host operating system upon receiving the called power pack name and the called power attribute name, a first power attribute file corresponding to the called power pack name and the called power attribute name to the guest operating system.

According to some embodiments of the electronic apparatus, the step/operation of providing a plurality of first power attribute files in the host operating system and a plurality of second power attribute files in the guest operating system in the method includes the following sub-steps/sub-options:

generating, in the host operating system, the plurality of first power attribute files;

generating in the host operating system, and sending to the guest operating system, a pack name code and an attribute name code that correspond respectively to a power pack name and a power attribute name in each of the plurality of first power attribute files; and generating, in the guest operating system, a second power attribute file corresponding to the pack name code and the attribute name code that correspond respectively to the power pack name and the power attribute name in the each of the plurality of first power attribute files to thereby generate the plurality of second power attribute files.

According to some embodiments of the electronic apparatus, the method further comprises, after the providing a plurality of first power attribute files in the host operating system and a plurality of second power attribute files in the guest operating system:

generating, upon detecting a change in any of the plurality of first power attribute files in the host operating system, a pack name code and an attribute name code that correspond respectively to a power pack name and a power attribute name in the any of the plurality of first power attribute files, and sending the pack name code and the attribute name code to the guest operating system; and reporting, in the guest operating system, the pack name code and the attribute name code to a user space of the guest operating system.

According to some embodiments of the electronic apparatus, the method further comprises, after the providing a plurality of first power attribute files in the host operating system and a plurality of second power attribute files in the guest operating system:

sending, upon detecting a change in any of the plurality of first power attribute files in the host operating system, a power attribute file change prompt to the guest operating system;

sending in the guest operating system, upon receiving the power attribute file change prompt in the guest operating system, a restarting message to a user.

In a fourth aspect, the present disclosure further provides a computer program product that can be used in combination with any one of the embodiments of the electronic apparatus as described above.

Herein, the computer program product can include a computer program embedded into a computer-readable storage medium. The computer program include instructions configured to enable the electronic apparatus to execute each step of the method for managing power supply in the electronic apparatus comprising a host operating system and a guest operating system. Herein the method can be based on any one of the embodiments as described above.

The following beneficial effects are achieved.

For each first power attribute file in the host operating system that includes a power pack name and a power attribute name, a pack name code of the power pack name and an attribute name code of the power attribute name are generated in the host operating system. A second power attribute file corresponding to the pack name code and the attribute name code is generated in the guest operating system. When the guest operating system calls any second power attribute file, a pack name code and an attribute name code corresponding to the any second power attribute file are decoded to obtain a called power pack name and a called power attribute name which correspond respectively to the pack name code and the attribute name code, and the called power pack name and the called power attribute name are then sent to the host operating system. In the host operating system, a first power pack file corresponding to the called power pack name and the called power attribute name is then provided to the guest operating system. As such, the invalidity risk of a power attribute file in an operating system can be reduced.

BRIEF DESCRIPTION OF THE DRAWINGS

Specific embodiments of the present disclosure will be described below with reference to the drawings.

DETAILED DESCRIPTION

In order to make the technical solutions and advantages of the inventions disclosed herein clearer, exemplary embodiments of the present disclosure will further be described below in combination with the drawings in detail. It is apparent that the described embodiments are not all embodiments but only part of embodiments of the present disclosure. Moreover, the embodiments in the disclosure and characteristics in the embodiments may be combined without conflicts.

According to a conventional technology, each operating system creates power attribute files, and each power attribute file typically includes a power pack name, a power attribute name and a power attribute value. When an operating system modifies a power attribute, all the operating systems are required to modify the corresponding power attribute files. In case of the presence of poor communications between these operating systems, there may exist a situation where a related power attribute file in certain operating system(s) changes but a power attribute in a related power attribute file in other operating system(s) does not change. This above situation may make the power attribute files corresponding to a same power attribute pair in each operating system inconsistent, which in turn may further cause the power attribute file that does not change invalid.

In light of this above issue, the present disclosure provides a power management method. In a host operating system, with regard to each power attribute file including a power pack name and a power attribute name, a pack name code and an attribute name code are generated respectively for the power pack name and the power attribute name in the each power attribute file; then in a guest operating system, a power attribute file corresponding to the pack name code and the attribute name code is generated. When the guest operating system calls any one power attribute file, a pack name code and an attribute name code corresponding to the any one power attribute file can be decoded to thereby obtain a power pack name and a power attribute name associated with a power pack to be called, and the power pack name and the power attribute name can then be sent to the host operating system. A power pack file corresponding to the power pack name and the power attribute name that are associated with the power pack to be called can then be provided by the host operating system to the guest operating system. Therefore, the invalidity risk of a power attribute file in an operating system can be reduced.

Figure 1:
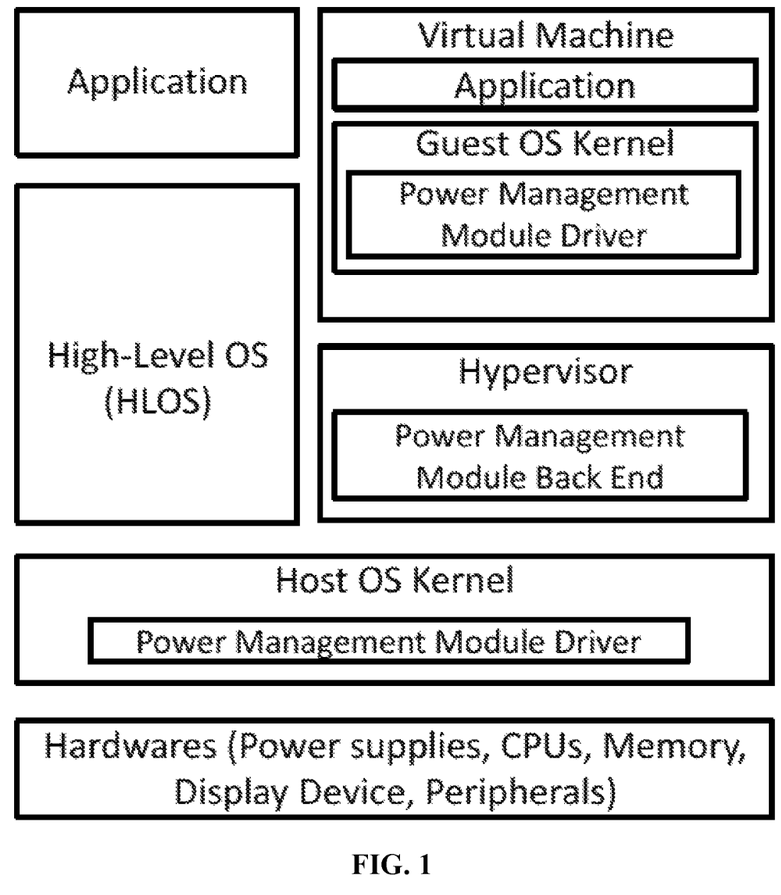
FIG. 1 is a structure diagram of an embedded system according to some embodiments of the disclosure.

The power management method provided in the disclosure can be applied in an embedded system. FIG. 1 shows one embodiment of an embedded system. As illustrated in FIG. 1, at least one virtual machine is deployed in the embedded system, and each virtual machine corresponds to a guest operating system (shown as "guest OS" in the figure). As such, the embedded system includes a host operating system (shown as "host OS" in the figure) and at least one guest operating system. A kernel of the host operating system includes a power management module driver, a kernel of each guest operating system also includes a power management module driver, and each virtual machine includes a power management module back end.

Figure 2:
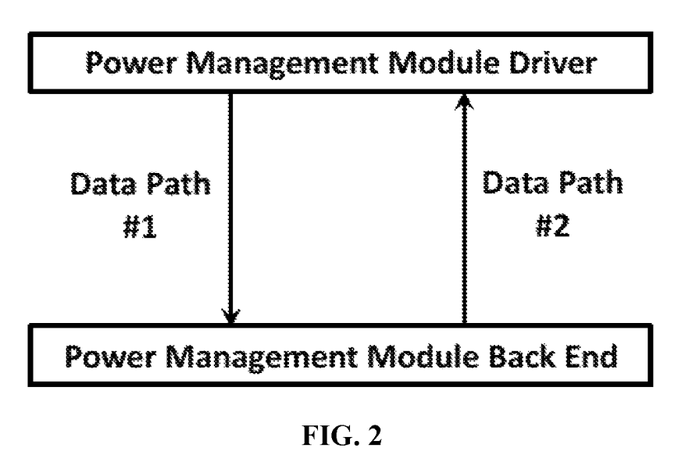
FIG. 2 is a schematic diagram of communication between a power management module back end and a power management module driver according to an embodiment of the disclosure.

The power management module back end is configured to communicate with the power management module driver. In an implementation process as shown in FIG. 2, two independent data paths are configured between the power management module back end and the power management module driver. A first data path (shown as "Data Path #1" in the figure) has a direction from the power management module driver to the power management module back end, and a second path (shown as "Data Path #2" in the figure) has a direction from the power management module back end to the power management module driver. The first path is configured to transmit information related to all coded power management attributes in the host operating system and the codes for coded power attribute files in the guest operating system. The second path is configured to transmit codes for the coded power attribute files that have changed in the host operating system.

Figure 3:
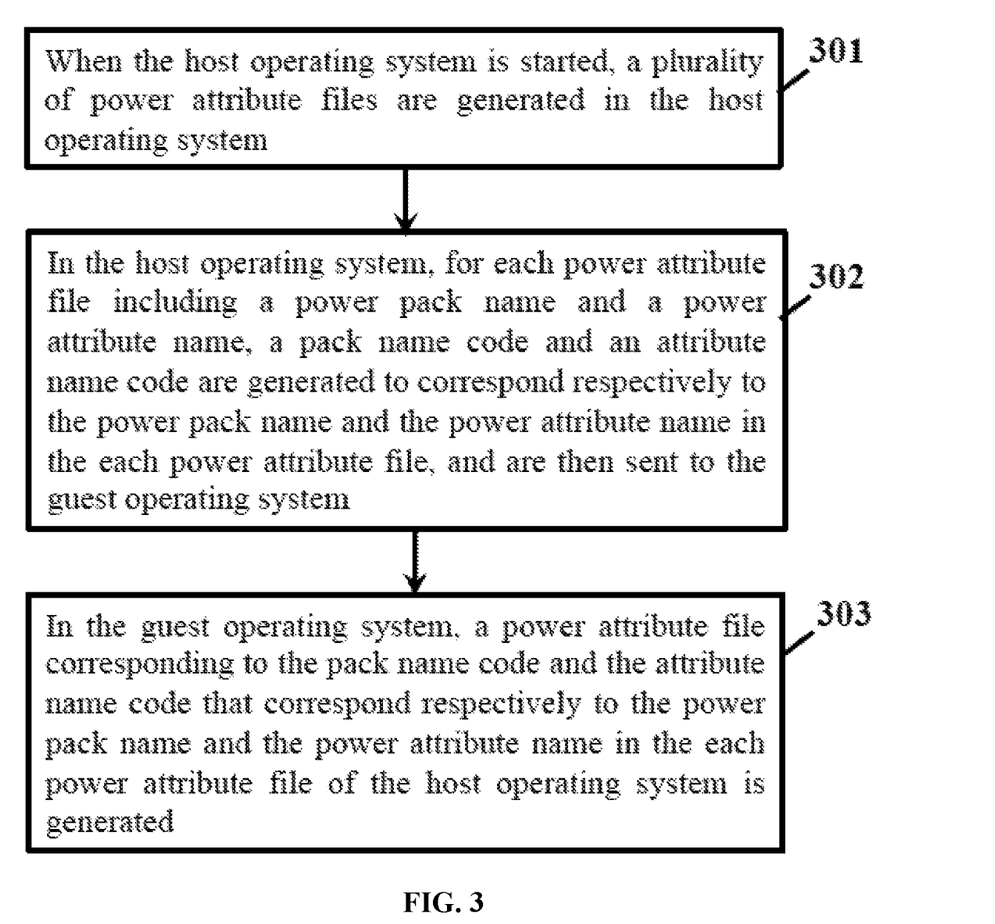
FIG. 3 is a flow chart of a power management method according to an embodiment of the disclosure.

During an initialization stage of the embedded system that implements a power management method according to some embodiments of the present disclosure, a flow chart of the steps executed is shown in FIG. 3.

Step 301 (i.e. S301 in the figure): When the host operating system is started or booted, a plurality of power attribute files are generated in the host operating system.

Specifically, the creation of the plurality of power attribute files for power management in the host operating system includes setting or arranging power supplies with different attributes into a plurality of power packs. Each of the plurality of power packs forms an attribute pair <power pack, power attribute> with a power attribute thereof, and a power attribute file is then created to correspond to the attribute pair in a one-to-one relationship. For convenient description, the power attribute files created in the host operating system are referred to as first power attribute files hereafter and throughout other part of the present disclosure.

Each first power attribute file includes a power pack name, a power attribute name and a power attribute value.

For example, an embedded system may include a direct current power supply, a first USB and a second USB. The direct current power supply forms a direct current power pack, and the first USB and the second USB form a USB pack. The direct current power pack includes attributes such as a current and a voltage. The USB pack includes attributes such as a voltage and whether the present USB pack is in an active state or not. As such, four attribute pairs, i.e., <direct current power pack, current>, <direct current power pack, voltage>, <USB pack, voltage> and <USB pack, whether the present USB pack is in an active state or not> respectively, are formed. By means of Step 301, the first power attribute files corresponding to each attribute pair in a one-to-one relationship can be created. Table 1 shows the plurality of first power attribute files created in the host operating system in the above illustrating example of the embedded system after the execution of Step 301 of the power management method illustrated in FIG. 3.

TABLE 1

| Attribute Pair | First Power Attribute File |
|---|---|
| <direct current power pack, current> | First power attribute file 1 |
| <direct current power pack, voltage> | First power attribute file 2 |
| <USB pack, voltage> | First power attribute file 3 |
| <USB pack, whether the present USB pack is in an active state or not> | First power attribute file 4 |

Step 302 (i.e. S302 in the figure): In the host operating system, for each power attribute file including a power pack name and a power attribute name, a pack name code and an attribute name code are generated to correspond respectively to the power pack name and the power attribute name of the each power attribute file, and then are sent to the guest operating system.

Specifically, the power pack name and power attribute name in each first power attribute file are acquired in the host operating system through the power management module back end.

In the above illustrating example of the embedded system, the power pack name and power attribute name in each of the plurality of first power attribute files are shown in Table 2.

TABLE 2

| First power attribute file | Power pack name | Power attribute name |
|---|---|---|
| First power attribute file 1 | Direct current power pack | Current |
| First power attribute file 2 | Direct current power pack | Voltage |
| First power attribute file 3 | USB pack | Voltage |
| First power attribute file 4 | USB pack | Whether the present USB pack is in an active state or not |

Herein, the power pack name and the attribute name in each first power attribute file can both be character strings, and an existing encoding rule and flow can be adopted to generate the pack name code for, or corresponding to, the power pack name in the first power attribute file and the attribute name code for, or corresponding to, the power attribute name in the first power attribute file.

In the above illustrating example of the embedded system, the corresponding relationship between a power pack name in each of the plurality of first power attribute files and a pack name code generated in Step 302, as well as the corresponding relationship between a power attribute name in each of the plurality of first power attribute files and an attribute name code generated in Step 302, are illustrated in Table 3.

TABLE 3

| First Power Attribute File | Power Pack Name | Pack Name Code | Power Attribute Name | Attribute Code |
|---|---|---|---|---|
| First power attribute file 1 | Direct current power pack | AA1 | Current | BB1 |
| First power attribute file 2 | Direct current power pack | AA1 | Voltage | BB2 |
| First power attribute file 3 | USB pack | AA2 | Voltage | BB2 |
| First power attribute file 4 | USB pack | AA2 | Whether the present USB pack is in an active state or not | BB3 |

After Step 302 is executed, the pair <power pack, power attribute> is converted into a pair <pack name code, attribute code>, as shown in Table 4.

TABLE 4

| Pair <power pack, power attribute> | Pair <pack name code, attribute code> |
|---|---|
| <direct current power pack, current> | <AA1, BB1> |
| <direct current power pack, voltage> | <AA1, BB2> |
| <USB pack, voltage> | <AA2, BB2> |
| <USB pack, whether the present USB pack is in an active state or not> | <AA2, BB3> |

Step 303 (i.e. S303 in the figure): In the guest operating system, a power attribute file corresponding to the pack name code and the attribute name code that correspond respectively to the power pack name and the power attribute name in the each power attribute file of the host operating system is generated.

In order to distinguish from the power attribute file (i.e., the first power attribute file) in the host operating system, a power attribute file which is generated in the guest operating system and corresponds to the pack name code and the attribute name code is referred to as a second power attribute file hereafter and throughout other part of the disclosure.

Specifically, when the guest operating system is started or booted, the second power attribute file can be generated in the guest operating system.

For example, upon booting of the guest operating system, a second power attribute file is generated in the guest operating system by means of a power management module driver therein.

In the above illustrating example of the embedded system, the plurality of second power attribute files generated in the guest operating system and corresponding to the pack name codes and the attribute name codes are shown in Table 5.

TABLE 5

| Pair <pack name code, attribute code> | Second power attribute file |
|---|---|
| <AA1, BB1> | Second power attribute file 1 |
| <AA1, BB2> | Second power attribute file 2 |
| <AA2, BB2> | Second power attribute file 3 |
| <AA2, BB3> | Second power attribute file 4 |

By executing Steps 301 to 303 (i.e. S301-S303), the host operating system encodes the power pack name and power attribute name in each of the plurality of first power attribute files according to a certain rule through a power management module back end, and sends these encoded data to the guest operating system, and the guest operating system generates a corresponding plurality of second power attribute files through the power management module driver, thereby completing an initialization process of a power management module of the guest operating system.

Herein, each first power attribute file includes a power pack name, a power attribute name and a power attribute value. Each second power attribute file is only a file with a read-only right, and is only required to correspond to the pack name code and the attribute code. Whether there is a content in the second power attribute file or not is not limited in the disclosure.

After the initialization of each operating system is completed, if a certain guest operating system is required to access a power attribute file, the following two steps may be executed.

Step 1.1: after the guest operating system calls any power attribute file, the pack name code and the attribute name code corresponding to the any power attribute file are decoded to obtain a called power pack name and a called power attribute name, and the called power pack name and the called power attribute name are then sent to the host operating system.

Herein, a decoding rule and flow for the process of decoding the pack name code and the attribute name code corresponding to the any power attribute file shall correspond to the encoding rule and flow used in Step 302.

For example, the guest operating system determines through the power management module driver that the second power attribute file to be accessed is the second power attribute file 3, the pack name code corresponding to the second power attribute file 3 is AA2, and the power attribute code corresponding to the second power attribute file 3 is BB2, namely <AA2, BB2>.

Step 1.2: after the called power pack name and the called power attribute name are received in the host operating system, a power pack file corresponding to the called power pack name and the called power attribute name is provided for the guest operating system.

After the called power pack name and the called power attribute name are received in the host operating system, a first power attribute file corresponding to the called power pack name and the called power attribute name in the host operating system can be accessed through the power management module back end, and the first power pack file corresponding to the called power pack name and the called power attribute name can then be provided for the guest operating system.

For example, after the called power pack name and the called power attribute name are received in the host operating system, the first power attribute file 3 corresponding to <AA2, BB2> in the host operating system is accessed through the power management module back end, and the first power pack file 3 is provided for the guest operating system.

Figure 4:
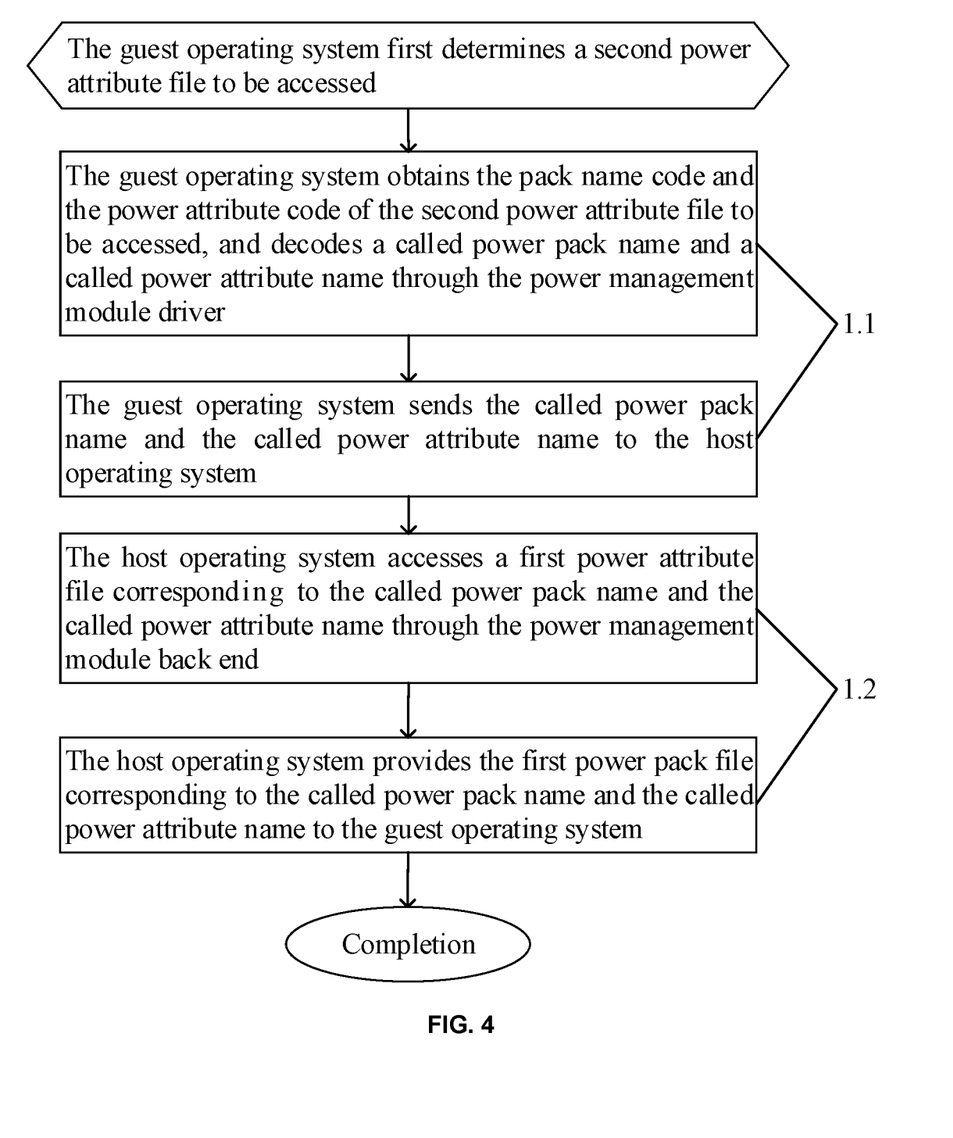
FIG. 4 is a flow chart of a power management method according to another embodiment of the disclosure.

Referring to FIG. 4, through Step 1.1 and Step 1.2, the guest operating system first determines a second power attribute file to be accessed or called, then the guest operating system obtains the pack name code and the power attribute code of the second power attribute file to be accessed, and decodes a called power pack name and a called power attribute name based on the pack name code and the power attribute code through the power management module driver, then the guest operating system sends the called power pack name and the called power attribute name to the host operating system. The host operating system accesses a first power attribute file in the host operating system that corresponds to the called power pack name and the called power attribute name through the power management module back end, and then provides the first power pack file corresponding to the called power pack name and the called power attribute name to the guest operating system. The guest operating system accesses the first power pack file provided by the host operating system that corresponds to the called power pack name and the called power attribute name through the power management module driver, thereby completing the process whereby the guest operating system accesses an attribute file of the power management module.

After completion of the initialization of each operating system, a certain first power attribute file in the host operating system may change. For example, a current value in the first power attribute file 1 changes from I1 to I2.

Under such a condition, i.e. when any first power attribute file in the host operating system changes, a pack name code of a changed power pack name and an attribute name code of a changed power attribute name can be generated in the host operating system, and can then be sent to the guest operating system.

In the guest operating system, the pack name code of the changed power pack name and the attribute name code of the changed power attribute name can then be reported to a user space of the guest operating system.

Herein, learning that a first power attribute file of the host operating system has changed can specifically include, but is not limited to, the following manner. After a first power attribute file of the host operating system changes, the power management module driver in the host operating system reports this event to the power management module back end. Under such a manner, learning that a first power attribute file in the host operating system has changed is by means of the power management module back end.

Figure 5:
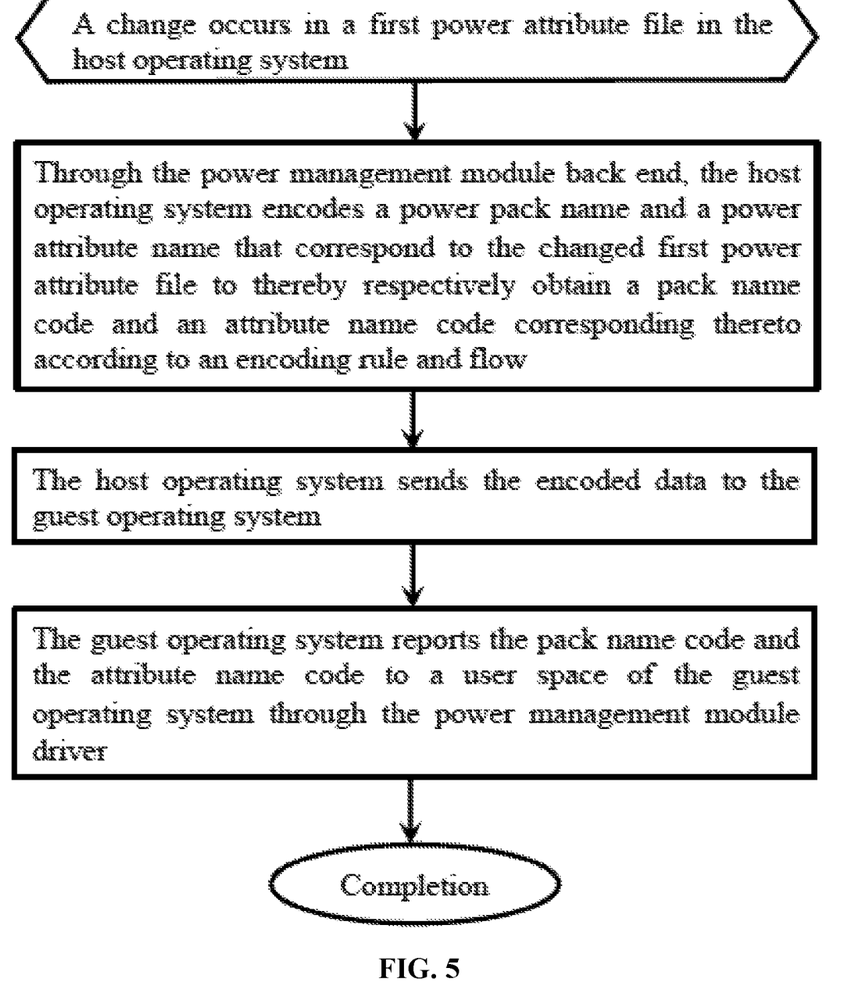
FIG. 5 is a flow chart of a power management method according to yet another embodiment of the disclosure.

Referring to FIG. 5, upon detecting a change in a certain first power attribute file (i.e. the changed first power attribute file) in the host operating system, through the power management module back end, a power pack name and a power attribute name corresponding to the changed first power attribute file are encoded according to the encoding rule and flow in Step 302 to thereby obtain a pack name code and an attribute name code that correspond respectively to the changed power pack name and the changed power attribute name, and the encoded data (i.e. the pack name code and the attribute name code) is then sent to the guest operating system. The guest operating system reports the pack name code and the attribute name code to the user space of the guest operating system through the power management module driver to thereby notify that the first power attribute file changes.

After the initialization of each operating system is completed, any of the plurality of first power attribute files in the host operating system may change. For example, a number of the power packs increases or decreases, certain power attribute increases or decreases, or certain power pack or certain power attribute has a name change.

Under such a condition, i.e. when any power attribute file of the host operating system changes, in the host operating system, a power attribute file change prompt can be sent to the guest operating system.

After the power attribute file change prompt is received in the guest operating system, a restarting message (or a rebooting message) can be displayed in the guest operating system. After a user responds to the restarting message, the guest operating system is restarted or rebooted, and then the second power attribute file of the guest operating system is further synchronized with the first power attribute file of the host operating system.

Through the power management method described above, for each first power attribute file in the host operating system that includes a power pack name and a power attribute name, a pack name code of the power pack name and an attribute name code of the power attribute name are generated in the host operating system. A second power attribute file corresponding to the pack name code and the attribute name code is generated in the guest operating system. When the guest operating system calls any second power attribute file, a pack name code and an attribute name code corresponding to the any second power attribute file are decoded to obtain a called power pack name and a called power attribute name which correspond respectively to the pack name code and the attribute name code, and the called power pack name and the called power attribute name are then sent to the host operating system. In the host operating system, a first power pack file corresponding to the called power pack name and the called power attribute name is then provided to the guest operating system. As such, the invalidity risk of a power attribute file in an operating system can be reduced.

When any first power attribute file in the host operating system changes, the guest operating system can still access the changed power attribute file in the host operating system through a pack name code and an attribute name code corresponding to the power attribute file, so that the issue associated with the current technology that the power attribute files may become invalid because of the inconsistent contents of the power attribute files can be avoided, thereby reducing the invalidity risk of a power attribute file in an operating system.

The following beneficial effects are achieved.

In the present disclosure, for each power attribute file in the host operating system that includes a power pack name and a power attribute name, a pack name code of the power pack name and an attribute name code of the power attribute name are generated; then a power attribute file corresponding to the pack name code and the attribute name code is generated in the guest operating system. When the guest operating system calls any power attribute file, the pack name code and attribute name code corresponding to the power attribute file are decoded to obtain the called power pack name and the called power attribute name, and the called power pack name and the called power attribute name are sent to the host operating system; and then in the host operating system, a power pack file corresponding to the called power pack name and the called power attribute name is provided to the guest operating system. Therefore, the invalidity risk of a power attribute file in an operating system can be reduced.

On the basis of the same inventive concept, the present disclosure further provides a power management device. The working principle of the power management device is similar to the power management method shown in FIG. 3, so that implementation of the power management device may reference to implementation of the power management method shown in FIG. 3, and the repeated parts will not be elaborated.

Figure 6:
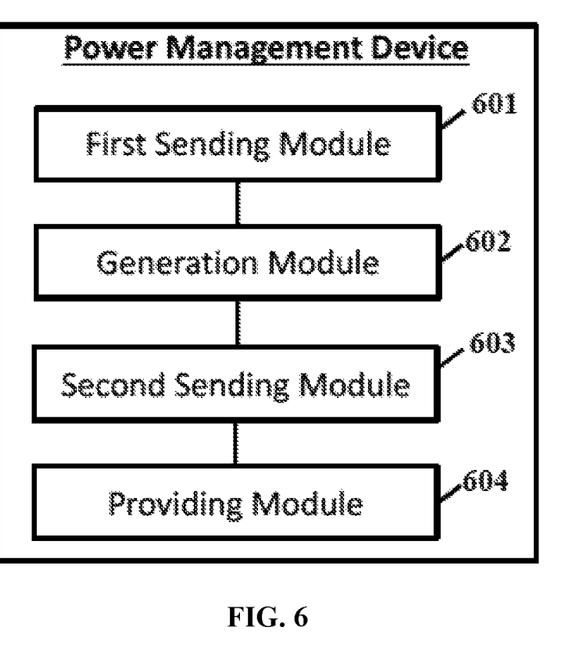
FIG. 6 is a structure diagram of a power management device according to an embodiment of the disclosure.

Referring to FIG. 6, the power management device includes a first sending module 601, a generation module 602, a second sending module 603 and a providing module 604.

The first sending module 601 is configured, for each first power attribute file in a host operating system that includes a power pack name and a power attribute name, to generate a pack name code and an attribute name code correspond respectively to the power pack name and the power attribute name, and then to send the pack name code and the attribute name code to a guest operating system.

The generation module 602 is configured to generate a second power attribute file corresponding to the pack name code and the attribute name code in the guest operating system.

The second sending module 603 is configured, when the guest operating system calls any second power attribute file, to decode a pack name code and an attribute name code corresponding to the any second power attribute file to thereby obtain a called power pack name and a called power attribute name, and then to send the called power pack name and the called power attribute name to the host operating system.

The providing module 604 is configured, after the called power pack name and the called power attribute name are received in the host operating system, to provide a first power pack file corresponding to the called power pack name and the called power attribute name to the guest operating system.

Optionally, the device further includes a third sending module and a reporting module.

The third sending module is configured, when any power attribute file of the host operating system changes, to generate a pack name code and an attribute name code that correspond respectively to the changed power pack name (i.e. the power pack name in the power attribute file that changes) and the changed power attribute name (i.e. the power attribute name in the power attribute file that changes) in the host operating system, and then to send the pack name code and the attribute name code to the guest operating system.

The reporting module is configured, in the guest operating system, to report the pack name code and the attribute name code to a user space of the guest operating system.

Optionally, the generation module 602 is configured to generate a second power attribute file corresponding to the pack name code and the attribute name code in the guest operating system when the guest operating system is started or booted.

Optionally, the power management device further includes a fourth sending module and a processing module.

The fourth sending module is configured, in the host operating system, to send a power attribute file change prompt to the guest operating system when any power attribute file of the host operating system changes.

The processing module is configured, after the power attribute file change prompt is received in the guest operating system, to display a restarting message in the guest operating system, and after a user responds to the restarting message, to restart or reboot the guest operating system.

By means of the power management device described above, the following beneficial effects can be achieved. For each first power attribute file in the host operating system that includes a power pack name and a power attribute name, a pack name code of the power pack name and an attribute name code of the power attribute name are generated in the host operating system. A second power attribute file corresponding to the pack name code and the attribute name code is generated in the guest operating system. When the guest operating system calls any second power attribute file, a pack name code and an attribute name code corresponding to the any second power attribute file are decoded to obtain a called power pack name and a called power attribute name which correspond respectively to the pack name code and the attribute name code, and the called power pack name and the called power attribute name are then sent to the host operating system. In the host operating system, a first power pack file corresponding to the called power pack name and the called power attribute name is then provided to the guest operating system. As such, the invalidity risk of a power attribute file in an operating system can be reduced.

Figure 7:
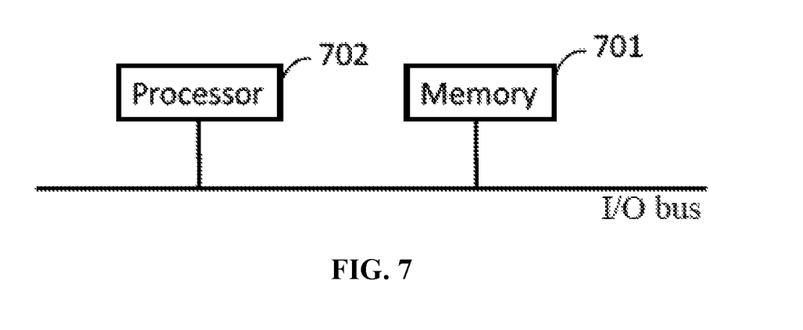
FIG. 7 is a structure diagram of an electronic apparatus according to an embodiment of the disclosure.

In another aspect, the present disclosure also provides an electronic apparatus. Referring to FIG. 7, the electronic apparatus includes a memory 701 and one or more processors 702 (for conciseness, only one processor 702 is shown in the figure). The memory 701 is communicatively connected with the processor 702 through a communication bus (i.e. "I/O bus" in the figure). The one or more processors 702 are configured to execute instructions in the memory. The instructions are configured to execute each of the above-mentioned steps in a power management method as described above and can be stored in a storage medium.

In yet another aspect, the present disclosure further provides a computer program product that can be used in combination with an electronic apparatus as described above. The computer program product includes a computer program embedded into a computer-readable storage medium. The computer program including an instruction configured to enable the electronic apparatus to execute each step in any power management method.

Those skilled in the art should know that the various embodiments of the disclosure may be provided as a method, a system or a computer program product. Therefore, the invention disclosed herein may adopt a form of pure hardware embodiments, a form of pure software embodiments, or a form of combined software and hardware embodiments. Moreover, the invention disclosed herein may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flow charts and/or block diagrams of the method, device (system) and computer program product according to the embodiments of the disclosure. It is to be understood that each step/block in the flow charts, the block diagrams, or a combinations thereof may be implemented by computer program instructions. These computer program instructions may be provided for a universal computer, a dedicated computer, an embedded processor, or a processor of another programmable data processing device to thereby generate a machine, so that a device for realizing a function specified in one or more steps/blocks in the flow charts and/or the block diagrams is generated by the instructions executed through the above mentioned universal or dedicated computer, the embedded processor, or the another programmable data processing device.

These computer program instructions may also be stored in a computer-readable storage device capable of guiding the above mentioned universal or dedicated computer, the embedded processor, or the another programmable data processing device to work in a specific manner, so that a product including an instruction device may be generated by the instructions stored in the computer-readable storage device. The instruction device can realize the function(s) specified in one or more steps in the flow charts and/or one or more blocks in the block diagrams.

These computer program instructions may further be loaded onto the universal or dedicated computer, the embedded processor, or the another programmable data processing device, so that a series of operating steps are executed thereon to generate computer-implemented processes. As such, steps for realizing the function specified in one or more steps in the flow charts and/or one or more blocks in the block diagrams are provided by the instructions executed on the universal or dedicated computer, the embedded processor, or the another programmable data processing device.

Throughout the disclosure, each of the terms "module," "sub-module," or alike, is referred to as a computer-implemented functional entity, which comprises at least one processor and a memory, wherein the memory is configured to store a software program (i.e. computer codes or executable instructions), and the at least one processor is configured to perform a calculation based on the software program stored in the memory to thereby perform a task carrying out the prescribed functionality. Furthermore, the at least one processor may include one or more controllers, general processors, specialized processors, coprocessors, etc., and the at least one processor can be arranged in a parallel processing structure and/or multiprocessing structure. In addition, each of the above terms may be a general computer having the software program, or can be a hardware computing device specifically designed for such a task. The computer and the hardware computing device can be locally arranged, or can be remotely arranged, such as on an intranet, an internet, or in a cloud.

Throughout the disclosure, each of a method, a step, a sub-step, a process and a feature, etc., may be implemented as part of an operating system or a specific application, component, program, object, module, or series of instructions referred to as "programs". For example, one or more programs may be used to execute specific processes described herein. The programs typically comprise one or more instructions in various memory and storage devices in a computer system that, when read and executed by at least one processor, cause the computer system to perform operations to execute the method, the step, the sub-step, the process, and the feature, etc. Each of a method, a step, a sub-step, a process and a feature, etc., may be implemented in software, firmware, hardware (e.g., an application specific integrated circuit), or any combination thereof.

It will also be understood that, ordinal indicators, such as "first," "second," and etc., as used in the specification and the claims to refer to various elements (such as components, structures, or method steps, etc.), are not meant to be construed to indicate any specific elements, or any particular order or configuration to such elements, but are only used to distinguish one element from another. These elements, however, should not be limited by the use of these ordinal indicators. For example, a first module could be termed a second module, and similarly, a second module could be termed a first module without departing from the scope of the various described embodiments. The first module and the second module are both modules, but they are not the same module.

As used in this specification and the appended claims, the singular terms "a", "an", and "the" include both singular and plural references, and thus could mean "one or more" unless otherwise specified or indicated by context. For example, a reference to "an apparatus" or "a composition" should be interpreted to mean "one or more apparatuses" or "one or more compositions," respectively.

As used herein, the term "if" is, optionally, construed to mean "when" or "upon" or "in response to determining" or "in response to detecting," depending on the context. Similarly, the phrase "if it is determined" or "if a stated condition or event is detected" is, optionally, construed to mean "upon determining" or "in response to determining" or "upon detecting the stated condition or event" or "in response to detecting the stated condition or event," depending on the context.

Although the preferred embodiments of the present disclosure have been described, those skilled in the art, once learning about basic creative concepts, may make other variations and modifications to these embodiments. Therefore, it is intended to explain the appended claims to include the preferred embodiments and all the variations and modifications falling within the scope of the present disclosure.

The invention claimed is:

1. A method for managing power supply in an electronic apparatus comprising a host operating system and a guest operating system, the method comprising:
   providing a plurality of first power attribute files in the host operating system and a plurality of second power attribute files in the guest operating system, wherein:
      each of the plurality of first power attribute files comprises a power pack name and a power attribute name; and
      each of the plurality of second power attribute files corresponds to a pack name code and an attribute name code that correspond respectively to a power pack name and a power attribute name in each of the plurality of first power attribute files;
   decoding, when the guest operating system calls any of the plurality of second power attribute files, a pack name code and an attribute name code corresponding to the any of the plurality of second power attribute files to thereby obtain a called power pack name and a called power attribute name, and sending the called power pack name and the called power attribute name to the host operating system; and
   providing, in the host operating system upon receiving the called power pack name and the called power attribute name, a first power attribute file corresponding to the called power pack name and the called power attribute name to the guest operating system.

2. The method of claim 1, wherein the providing the plurality of first power attribute files in the host operating system and the plurality of second power attribute files in the guest operating system comprises:
   generating, in the host operating system, the plurality of first power attribute files;
   generating in the host operating system, and sending to the guest operating system, the pack name code and the attribute name code that correspond respectively to the power pack name and the power attribute name in each of the plurality of first power attribute files; and generating, in the guest operating system, a second power attribute file corresponding to the pack name code and the attribute name code that correspond respectively to the power pack name and the power attribute name in the each of the plurality of first power attribute files to thereby generate the plurality of second power attribute files.

3. The method of claim 2, wherein the generating, in the host operating system, the plurality of first power attribute files is performed when the host operating system is started.

4. The method of claim 2, wherein the generating in the host operating system, and sending to the guest operating system, the pack name code and the attribute name code that correspond respectively to the power pack name and the power attribute name in each of the plurality of first power attribute files comprises:
    acquiring, in the host operating system, the power pack name and the power attribute name in the each of the plurality of first power attribute files.

5. The method of claim 4, wherein the acquiring, in the host operating system, the power pack name and the power attribute name in the each of the plurality of first power attribute files is by means of a power management module back end.

6. The method of claim 2, wherein the generating, in the guest operating system, the second power attribute file corresponding to the pack name code and the attribute name code that correspond respectively to the power pack name and the power attribute name in the each of the plurality of first power attribute files to thereby generate the plurality of second power attribute files is performed when the guest operating system is started.

7. The method of claim 6, wherein the generating, in the guest operating system, the second power attribute file corresponding to the pack name code and the attribute name code that correspond respectively to the power pack name and the power attribute name in the each of the plurality of first power attribute files to thereby generate the plurality of second power attribute files is performed by means of a power management module driver.

8. The method of claim 1, further comprising, after the providing the plurality of first power attribute files in the host operating system and the plurality of second power attribute files in the guest operating system:
    generating, upon detecting a change in any of the plurality of first power attribute files in the host operating system, a second pack name code and a second attribute name code that correspond respectively to a second power pack name and a second power attribute name in the any of the plurality of first power attribute files, and sending the second pack name code and the second attribute name code to the guest operating system; and
    reporting, in the guest operating system, the second pack name code and the second attribute name code to a user space of the guest operating system.

9. The method of claim 8, wherein the generating, upon detecting the change in any of the plurality of first power attribute files in the host operating system, the second pack name code and the second attribute name code that correspond respectively to the second power pack name and the second power attribute name in the any of the plurality of first power attribute files, and sending the second pack name code and the second attribute name code to the guest operating system is by means of a power management module back end.

10. The method of claim 8, wherein the reporting, in the guest operating system, the second pack name code and the second attribute name code to the user space of the guest operating system to thereby notify that the any of the plurality of first power attribute files changes is by means of a power management module driver.

11. The method of claim 1, further comprising, after the providing the plurality of first power attribute files in the host operating system and the plurality of second power attribute files in the guest operating system:
    sending, upon detecting a change in any of the plurality of first power attribute files in the host operating system, a power attribute file change prompt to the guest operating system;
    sending in the guest operating system, upon receiving the power attribute file change prompt in the guest operating system, a restarting message to a user; and
    restarting, upon the user responding to the restarting message, the guest operating system to thereby synchronize the plurality of second power attribute files in the guest operating system with the plurality of first power attribute files in the host operating system.

12. An electronic apparatus, comprising:
    one or more processors; and
    a memory, communicatively connected with the one or more processors through a communication bus, the memory storing instructions;
    wherein:
        the instructions in the memory that, when executed by the one or more processors, are configured to perform each step of a method for managing power supply in the electronic apparatus comprising a host operating system and a guest operating system, the method comprising:
        providing a plurality of first power attribute files in the host operating system and a plurality of second power attribute files in the guest operating system, wherein each of the plurality of first power attribute files comprises a power pack name and a power attribute name, and each of the plurality of second power attribute files corresponds to a pack name code and an attribute name code that correspond respectively to a power pack name and a power attribute name in each of the plurality of first power attribute files;
        decoding, when the guest operating system calls any of the plurality of second power attribute files, a pack name code and an attribute name code corresponding to the any of the plurality of second power attribute files to thereby obtain a called power pack name and a called power attribute name, and sending the called power pack name and the called power attribute name to the host operating system; and
        providing, in the host operating system upon receiving the called power pack name and the called power attribute name, a first power attribute file corresponding to the called power pack name and the called power attribute name to the guest operating system.

13. The electronic apparatus according to claim 12, wherein in the method, the providing the plurality of first power attribute files in the host operating system and the plurality of second power attribute files in the guest operating system comprises:
    generating, in the host operating system, the plurality of first power attribute files;
    generating in the host operating system, and sending to the guest operating system, the pack name code and the attribute name code that correspond respectively to the power pack name and the power attribute name in each of the plurality of first power attribute files; and generating, in the guest operating system, a second power attribute file corresponding to the pack name code and the attribute name code that correspond respectively to the power pack name and the power attribute name in the each of the plurality of first power attribute files to thereby generate the plurality of second power attribute files.

14. The electronic apparatus according to claim 12, wherein the method further comprises, after the providing the plurality of first power attribute files in the host operating system and the plurality of second power attribute files in the guest operating system:

generating, upon detecting a change in any of the plurality of first power attribute files in the host operating system, a second pack name code and a second attribute name code that correspond respectively to a second power pack name and a second power attribute name in the any of the plurality of first power attribute files, and sending the second pack name code and the second attribute name code to the guest operating system; and reporting, in the guest operating system, the second pack name code and the second attribute name code to a user space of the guest operating system.

15. The electronic apparatus according to claim 12, wherein the method further comprises, after the providing the plurality of first power attribute files in the host operating system and the plurality of second power attribute files in the guest operating system:

sending, upon detecting a change in any of the plurality of first power attribute files in the host operating system, a power attribute file change prompt to the guest operating system;

sending in the guest operating system, upon receiving the power attribute file change prompt in the guest operating system, a restarting message to a user.

16. The electronic apparatus according to claim 13, wherein the generating, in the host operating system, the plurality of first power attribute files is performed when the host operating system is started.

17. The electronic apparatus according to claim 13, wherein the generating in the host operating system, and sending to the guest operating system, the pack name code and the attribute name code that correspond respectively to the power pack name and the power attribute name in each of the plurality of first power attribute files comprises:

acquiring, in the host operating system, the power pack name and the power attribute name in the each of the plurality of first power attribute files.

18. The electronic apparatus according to claim 17, wherein the acquiring, in the host operating system, the power pack name and the power attribute name in the each of the plurality of first power attribute files is by means of a power management module back end.

19. The electronic apparatus according to claim 13, wherein the generating, in the guest operating system, the second power attribute file corresponding to the pack name code and the attribute name code that correspond respectively to the power pack name and the power attribute name in the each of the plurality of first power attribute files to thereby generate the plurality of second power attribute files is performed when the guest operating system is started.

20. The electronic apparatus according to claim 19, wherein the generating, in the guest operating system, the second power attribute file corresponding to the pack name code and the attribute name code that correspond respectively to the power pack name and the power attribute name in the each of the plurality of first power attribute files to thereby generate the plurality of second power attribute files is performed by means of a power management module driver.

* * * * *